United States Patent
Corona (10) Patent No.: US 9,614,361 B2
(45) Date of Patent: Apr. 4, 2017

(54) WATERPROOF SEAL FOR ELECTRICAL ASSEMBLIES (71) Applicant: DSM&T Company, Inc., Fontana, CA (US)

(72) Inventor: Sergio Corona, Upland, CA (US)

(73) Assignee: DSM&T Company, Inc., Fontana, CA (US)

( * ) Notice: Subject to any disclaimer, the term of this patent is extended or adjusted under 35 U.S.C. 154(b) by 595 days.

(21) Appl. No.: 14/100,507

(22) Filed: Dec. 9, 2013

(65) Prior Publication Data

US 2014/0174822 A1 Jun. 26, 2014

Related U.S. Application Data (60) Provisional application No. 61/735,756, filed on Dec. 11, 2012.

(51) Int. Cl.
*H02G 3/02* (2006.01)
*H02G 15/02* (2006.01)
*H02G 15/08* (2006.01)
*H01R 4/18* (2006.01)
*H02G 3/06* (2006.01)
*H01R 13/52* (2006.01)
*H01R 9/24* (2006.01)
*H01R 13/02* (2006.01)
*H02G 15/04* (2006.01)
*H01R 4/02* (2006.01)
(Continued)

(52) U.S. Cl.
CPC ............... *H02G 15/04* (2013.01); *H01R 4/02* (2013.01); *H01R 13/521* (2013.01); *H01R 13/5205* (2013.01); *H01R 43/24* (2013.01); *H02G 15/003* (2013.01)

(58) Field of Classification Search
CPC ........ H02G 15/04; H02G 3/0616; H01R 4/02; H01R 4/14; H01R 4/16; H01R 4/18; H01R 4/023; H01R 4/024; H01R 4/187; H01R 4/20
USPC .......................................................... 174/76
See application file for complete search history.

(56) References Cited

U.S. PATENT DOCUMENTS 2,858,358 A 10/1958 Hawke
3,364,460 A * 1/1968 Bergan .................. H01R 4/187
439/882
(Continued)

FOREIGN PATENT DOCUMENTS

JP 2010020980 A * 1/2010

OTHER PUBLICATIONS

Machine Translation of Hagi (JP 2010-20980A) provided with Office Action.*

*Primary Examiner* — Chau N Nguyen
*Assistant Examiner* — Roshn Varghese
(74) *Attorney, Agent, or Firm* — Keusey & Associates, P.C.

(57) ABSTRACT

A waterproof seal for electrical assemblies having conductive wires attached to a metal contact and inserted into a connector body. The conductive wires and metal contact are coated with solder to fill the gaps. The space between the soldered wires and the connector body are filled with an epoxy. The wire insulation and connector body are continuously sealed with a bonding agent. A section of wire insulation and the connector body are encased within an outer plastic jacket overmold.

19 Claims, 5 Drawing Sheets

(51) Int. Cl.
*H01R 43/24* (2006.01)
*H02G 15/00* (2006.01)

(56) References Cited

U.S. PATENT DOCUMENTS

| | | | | |
|---|---|---|---|---|
| 3,946,263 A | * | 3/1976 | Protzeller | F21V 31/04 439/271 |
| 3,956,575 A | | 5/1976 | Sutherland | |
| 4,454,197 A | * | 6/1984 | Laganis | C08G 59/52 174/110 E |
| 4,571,018 A | | 2/1986 | Annoot | |
| 4,590,329 A | | 5/1986 | Potochnik et al. | |
| H000113 H | * | 8/1986 | McNeel | H01R 13/5833 439/282 |
| 4,737,117 A | * | 4/1988 | Lockard | H01R 23/662 439/108 |
| 4,874,324 A | * | 10/1989 | Andersen | H01R 13/523 439/271 |
| 5,198,962 A | * | 3/1993 | Tyson | F21S 8/022 439/736 |
| 5,315,066 A | * | 5/1994 | Spiteri, Sr. | H01R 4/22 174/87 |
| 5,418,331 A | * | 5/1995 | Delalle | H01R 4/22 439/874 |
| 5,795,170 A | * | 8/1998 | Okabe | H01R 13/5216 439/252 |
| 6,069,320 A | | 5/2000 | Rocci et al. | |
| 6,431,904 B1 | * | 8/2002 | Berelsman | H01R 13/5845 439/344 |
| 6,444,914 B1 | | 9/2002 | Su | |
| 7,431,602 B2 | | 10/2008 | Corona | |
| 8,502,090 B2 | * | 8/2013 | Winship | H02G 3/22 439/271 |
| 2005/0191882 A1 | * | 9/2005 | Torii | H01R 4/22 439/98 |
| 2013/0008714 A1 | * | 1/2013 | Morikawa | H01R 4/20 174/74 R |
| 2013/0129289 A1 | | 5/2013 | Roland | |

\* cited by examiner

WATERPROOF SEAL FOR ELECTRICAL ASSEMBLIES

CROSS-REFERENCE TO RELATED APPLICATIONS

This application claims priority of U.S. Provisional Application Ser. No. 61/735,756 filed on Dec. 11, 2012.

BACKGROUND OF THE INVENTION

1. Field of the Invention

The present invention relates to a waterproof seal for electrical assemblies. The sealing method protects electrical devices by preventing the wicking of fluid through electrical wires. In this case, the sealing is in the form of a 4-step connector sealing process, which creates an airtight, and more importantly a watertight seal.

2. The Prior Art

Other types of sealing methods are known in the art. For example, sealing methods for electrical connectors may be disclosed in the following U.S. patents: U.S. patent application Ser. No. 13/300,182 to Rowland on May 23, 2013; U.S. Pat. No. 7,431,602 to Corona issued on Apr. 21, 2005; U.S. Pat. No. 6,444,914 issued to Su on Sep. 3, 2002; U.S. Pat. No. 6,069,320 to Rocci et al issued on May 30, 2000; U.S. Pat. No. 4,571,018 to Annoot issued on Feb. 18, 1986; U.S. Pat. No. 4,590,329 to Potochnik et al issued on May 20, 1986; U.S. Pat. No. 3,956,575 to Sutherland issued on May 11, 1976; and U.S. Pat. No. 2,858,358 to Hawke issued on Oct. 28, 1958.

SUMMARY OF THE INVENTION

The invention relates to a sealing process that prevents fluids from damaging a plurality of electrical devices. Liquids routinely travel through air gaps in wire and cable causing many electrical devices to prematurely fail. Any liquid that reaches an electrical device can cause damage of the internal components, which leads to product failures. The presence of moisture in an electrical device also can rapidly increase the current in the circuit, which in most modern appliances will cause a short circuit as the fuse is blown.

Accordingly, it is an object of the present invention to provide a waterproof seal for the protection of connected electrical devices.

It is another object to layer different types of materials at the connector to build a waterproof seal.

It is a further object to select materials for compatibility and adhesion to underlying layers.

These and related objects are achieved according to the invention by providing a waterproof seal for electrical assemblies. The electrical seal resides at the critical and vulnerable points where a cable is attached to a connector. The electrical cable has at least one conductive wire covered with insulation and a terminal end stripped of insulation. A metal post is provided with a contact section and a juncture section securely connected to the terminal end. A coating of solder is applied to the terminal end to fill the spaces between the terminal end and the juncture section. The metal post is inserted into a connector body so that the connector body surrounds the metal post. An epoxy material is disposed between said connector body and the juncture section to fill the space therebetween. A bonding agent covers the connector body and cable insulation. An outer thermoplastic jacket is overmolded to the connector body, said bonding agent and the cable insulation. The outer thermoplastic jacket prevents moisture from penetrating into the connector body, and the solder and epoxy material occupy spaces within said connector body to prevent water from wicking along the wire.

The electrical cable includes one or more conductive wires covered with insulation. The wire has multiple wire strands, and the solder fills the spaces between the wire strands. The waterproof seal according to the invention can also be used with solid wire. The solder coating is preferably a tin solder coating to electrically and mechanically improve the connection between the wire and the juncture section. The seal may be used with multiple connectors.

The epoxy is a thermoplastic material or a thermoset material. The epoxy may be formulated as a hot melt adhesive (HMA). The bonding agent is a one-part or two-part epoxy cement. The overmold material is a thermoplastic material. The overmold material may be polyethylene (PE), polystyrene (PS), polypropylene (PP), polyvinyl chloride (PVC), ethylene propylene diene monomer (EPDM) or Chlorobutyl Rubber.

The electrical assembly provides a wicking barrier to prevent fluid from damaging attached equipment. The electrical assembly is ideally suited for use in outdoor lighting applications. The epoxy material may be a water-borne epoxy coating. The outer thermoplastic jacket is made from a thermoplastic elastomer (TPE).

The terminal ends are sealed within multiple concentric layers of protective materials consisting of in order from the center extending radially outward:

(a) a central bundle containing terminal ends, solder and juncture section, (b) a layer of epoxy consisting of a thermoplastic material or a thermoset material, (c) the juncture housing consisting of a plastic material, (d) a bonding agent in the form of a 1- or 2-part cement, and (e) an outer plastic jacket overmold made from a thermoplastic material, a thermoset material or a thermoplastic elastomer, wherein the multiple layers of protective materials encase the terminal ends and prevent moisture from penetrating radially inward. By stating that the layers "consist of" applicant intends that these layers and only these layers are present. No other additional layers are present.

The conductive wires are sealed within multiple concentric layers of protective materials consisting of in order from the center extending radially outward:

(i) a central bundle containing conductive wire and solder, (ii) a layer of insulation encasing the conductive wire, (iii) a bonding agent in the form of a 1- or 2-part cement, and (iv) an outer plastic jacket overmold made from a thermoplastic material, a thermoset material or a thermoplastic elastomer, wherein the multiple layers of protective materials encase the conductive wires and prevent moisture from penetrating radially inward. By stating that the layers "consist of" applicant intends that these layers and only these layers are present. No other additional layers are present.

The bonding agent and the outer plastic jacket overmold layer extend continuously from the juncture housing to the layer of insulation. The solder extends continuously from the terminal ends to the conductive wire to prevent moisture from wicking axially along the conductive wires. The electrical seal is claimed in combination with an electrical device, where the electrical device is coupled to the connector body. The solder prevents moisture from wicking axially along the conductive wires into the electrical device.

Another aspect of the invention is accomplished by completing a four-step connector sealing process. The first step of the connector sealing process consists of first tinning a plurality of wire strands with a solder like material to make a solid connection into a plurality of connector bodies. Second, a plurality of wire strands are inserted into a plurality of electrical connectors and a substantially fluid or gel like material like epoxy is injected into the back end of the connector body which prevents fluid from entering the connector body. Next, a bonding agent is applied to the surface of the connector body and also to the wire jacketing to further strengthen the waterproof connection between the wire and the connector. Lastly, a moldable material such as PVC is molded over both a plurality of connector bodies and the wire jacketing to finish the process and complete a substantially sealed anti-wicking, waterproof connection.

This process can be used with any commercially available solid connector including but not limited to Amp, Deutsch, Molex and ETC brands. Only solid wire is used. Hollow terminals and stranded wire are not used because of possible water migration through the strands.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

Figure 1A:
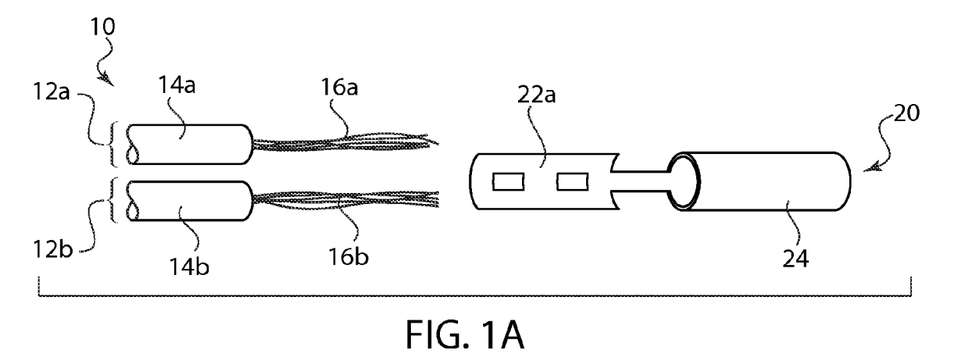
FIGS. 1A and 1B are side views of terminal wire ends intertwining with a metal contact.

Referring now in detail to the drawings, there is shown an embodiment of the construction for the waterproof seal for electrical connectors or electrical assemblies. In FIG. 1A an electrical cable 10 is provided which includes at least one insulated conductive wires. For the sake of simplicity, one or two conductive wires will be shown in the drawings, it being understood that the waterproof seal could be duplicated for use on any number of conductive wires contained within the electrical cable. In FIG. 1A, electrical cable 10 is shown with two insulated conductive wires 12a and 12b. Removing a small section of insulation 14a, 14b exposes terminal ends 16a, 16b of the conductive wire. The terminal ends, or stripped wires, may be solid wire or stranded wires.

Figure 1B:
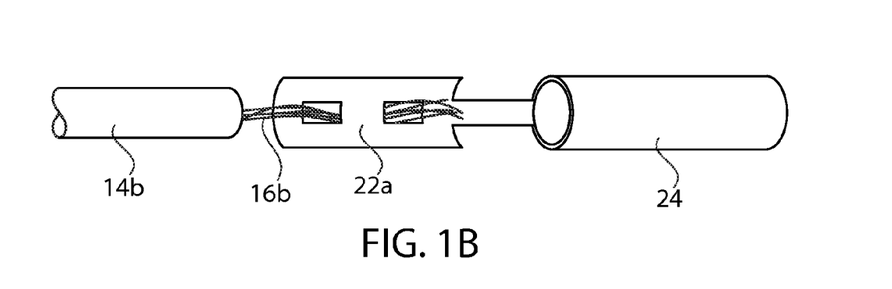

In order to safety and securely couple and uncouple electrical circuits, electrical cables are fitted with connectors 40. The connectors typically include a housing which contains a metal post. Metal post 20 includes a juncture section 22a which attaches to the terminal end and a contact section 24 which is configured as a male or female contact. The metal post 20 is physically attached to the terminal end 16b, for example, by intertwining or crimping. FIG. 1B shows terminal ends 16b that are intertwined through apertures formed in juncture section 22a. It will be appreciated by those skilled in the art that the juncture section may be formed with slots, barbs and other structures to allow the terminal end to tie onto.

Figure 1C:
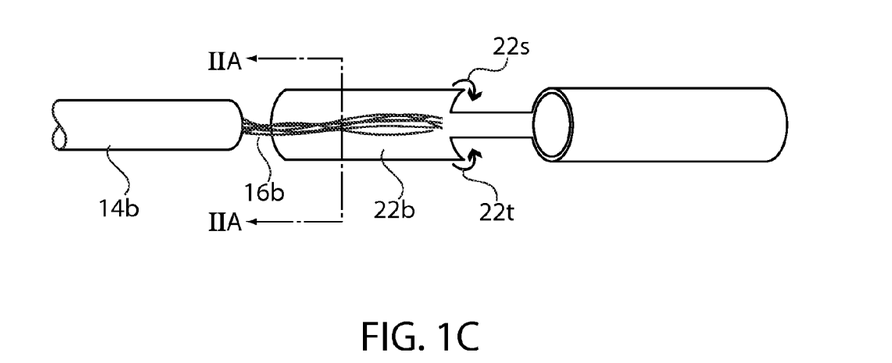
FIG. 1C is a side view of terminal wires attaching to a metal contact with crimp connection.

As can be seen in FIG. 1C, juncture section 22b, in an alternate embodiment, is formed as a flat plat that is folded over and crimped onto terminal end 16b consisting of stranded wires. More specifically, the top end of juncture section 22b is folded over counter-clockwise (toward the bottom of the page) and the bottom end of juncture section 22t is folded over clockwise toward the top of the page).

Figure 2A:
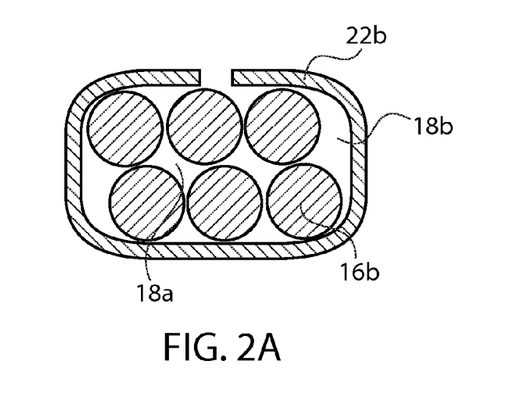
FIG. 2A is a cross-sectional view taken along the line from FIG. 1C with the connection crimped closed.

As can be seen in the cross-sectional view of FIG. 2A, the crimped juncture section 22b is roughly an oval shape enclosing a plurality of wire strands of the terminal end 16b. Due to the geometry of stacked circular wires, there are triangular or diamond shaped interstices 18a that are formed in the spaces between the individual stands. In addition, other varied shaped interstices 18b are formed between the bundle of wires and juncture section 22b. If wire strands are intertwined in juncture section 22a, similar triangular or diamond shaped interstices would be formed between the strands. Other interstices would be formed between the bundle of wires and the juncture section depending on its configuration. After the terminal end is intertwined or crimped to juncture section, the entire terminal end and juncture section is covered with a liquefied solder material 28, which solidifies the intertwined or crimped volumetric area of the plurality of wire strands.

Figure 2B:
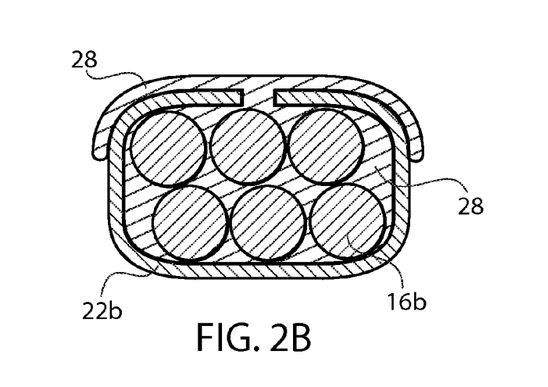
FIG. 2B is a similar cross-sectional view with the crimped connection filled with solder.

FIG. 2B is a cross-sectional view showing a plurality of wire strands 16b that have been covered with a liquefied tin solder material 28 along with the crimped on connector 22b. The solder material 28 that is applied to the plurality of wire strands, has two purposes. It allows the plurality of wire strands to make a solid, more substantial connection into the connector body and more importantly, prevents the wicking of fluid that may be traveling through the air gaps in the plurality of strands from leaking into the connector body. Any suitable electrical solder may be used, for example a tin solder.

Figure 3A:
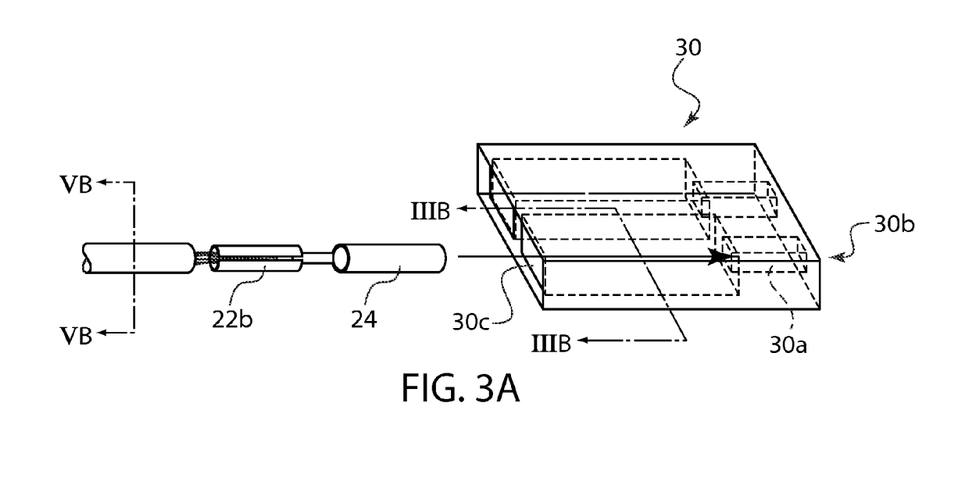
FIG. 3A is a side view of the soldered contact being installed in a connector body.
Figure 3B:
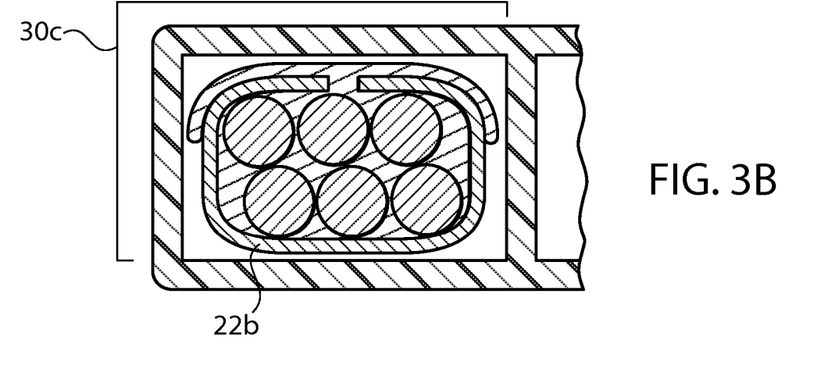
FIG. 3B is a cross-sectional view taken along the line IIIB-IIIB from FIG. 3A with the soldered contact fully installed.
Figure 3C:
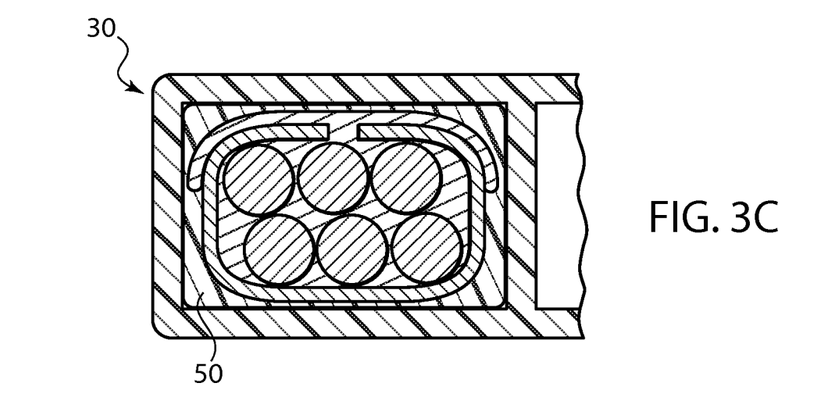
FIG. 3C is a similar cross-sectional view with the gap between the soldered contact and the connector body filled with epoxy.

FIG. 3A shows a connector body 30 having a contact slot 30a to receive contact section 24 from the back end. Aligned with contact slot 30a is a mating connector slot 30b on the front end. If contact section 24 is a female contact, then mating connector slot 30b would be configured to receive a male contact that would plug into the female contact. Behind contact slot 30a is a juncture housing 30c that will receive juncture section 22b, as can be seen in the cross-sectional view of FIG. 3B. Once contact section 24 is properly seated within contact slot 30a, the juncture housing is injected and filled with an epoxy 50, as shown in FIG. 3C. The juncture housing is effectively a 5-sided box with the juncture section positioned generally in the middle, with the insulated wire 14b extending out the open 6th side. The epoxy is poured or injected into the juncture housing to fill the box, preferably up to the beginning of the insulation 14b. By filling the connector body, moisture is prevented from passing through the open side of the connector body to the wire strand. Suitable materials for the epoxy consist of thermoplastic or thermoset materials. The epoxy may be delivered in the form of a hot melt adhesive (HMA), for example, 3M Scotch-Weld Hot Melt Adhesive.

Figure 4:
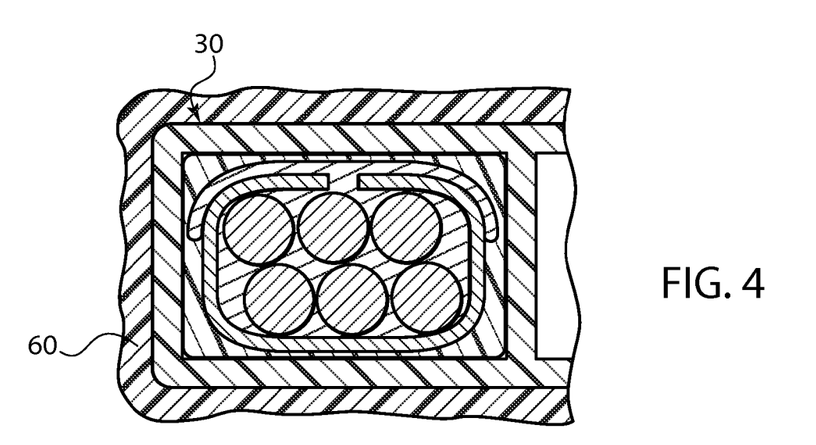
FIG. 4 is a further similar cross-sectional view with the connector body coated with a bonding agent.

To prevent moisture from entering the wire strand from the sides, the back end of the connector, wire strands and wire insulation are covered by a bonding agent 60, as shown in FIG. 4. Suitable materials will include cements that are compatible for bonding to the wire insulation 14b and the connector body 30. In a practical embodiment, the wire insulation and connector body are made of the same material, and a cement is selected with high adhesion to that same material and epoxy 50. The cement can be a one-part or two-part epoxy.

If the wire insulation 14b and connector body 30 are made from vinyl or PVC, one-part vinyl cement can be used. Suitable vinyl cements will have a Typical Specific Gravity of between 0.70 and 1.05 and Typical Viscosity of 80 to 2,400 cps, for example, WELD-ON Flexible Vinyl Cement, available from IPS Corporation of Compton, Calif.

Alternatively, a two-part epoxy may be used. Suitable two-part epoxies consist of adhesives used to bond thermoplastic elastomers (TPE's), PVC and Alcryn to metals. For example, Chemlok 481 combined with Chemlok Curative 44 is specified for bonding a wide variety of TPEs to metal. In another example, Chemlok 485 combined with Chemlok Curative 44 is specified for bonding PVC and Alcryn to substrates such as metal, rubber and other TPEs. Chemlok products are available from Lord Corporation of Erie, Pa.

Figure 5A:
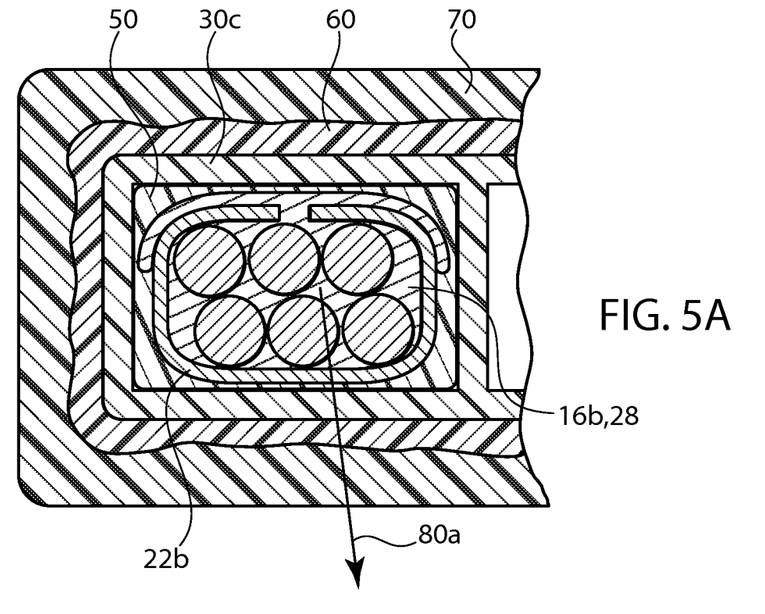
FIG. 5A is another similar cross-sectional view with the connector body encased within an overmold body.

FIG. 5A is a cross-sectional view of the connector showing the final step of the sealing process, which is over molding the connector to ensure no water, can ingress into the electrical connection. The over mold material is applied by placing the bonded connector of FIG. 4 into an injection mold and delivering thermoplastic or thermoset resin under high pressure (1,000 psi or greater) and temperature (300 degrees F. or greater). When the injected material solidifies it forms an overmold body 70. Suitable thermoplastics for the over mold material may include Polyethylene (PE), polystyrene (PS), polypropylene (PP) and polyvinyl chloride (PVC). In practical embodiments, PVC has been used to make durable, moisture resistant over mold bodies.

Figure 5B:
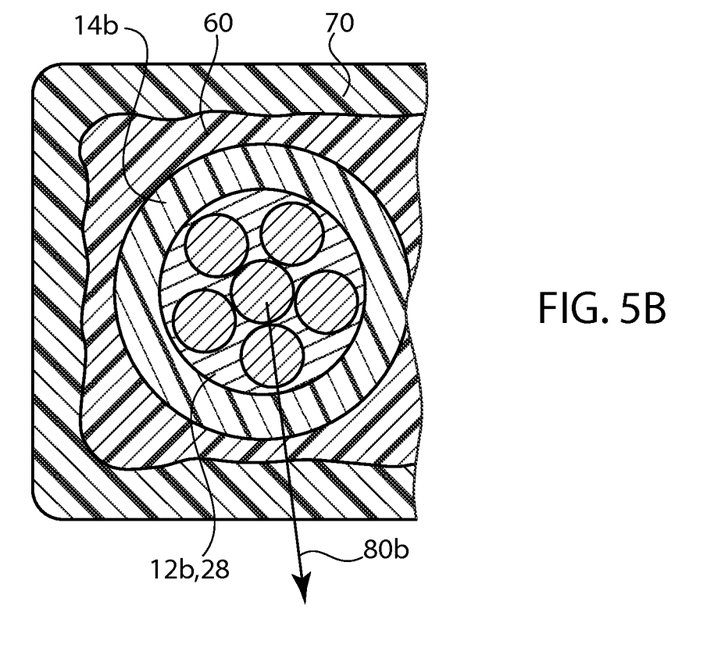
FIG. 5B is a cross-sectional view of the cable insulation encased within the overmold body taken along the line VB-VB from FIG. 3A.
Figure 6A:
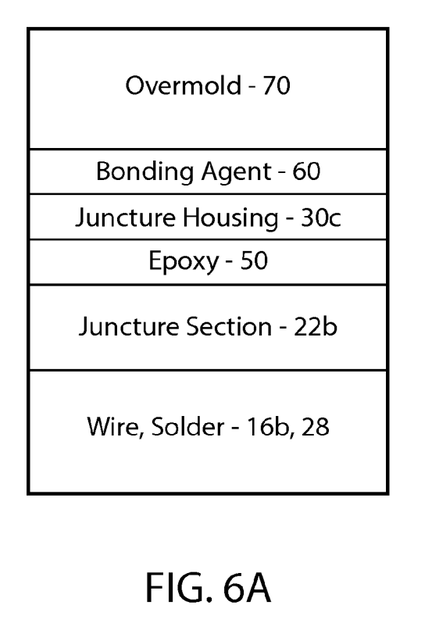
FIGS. 6A and 6B are comparative diagrams showing the layers from FIGS. 5A and 5B, respectively.
Figure 6B:
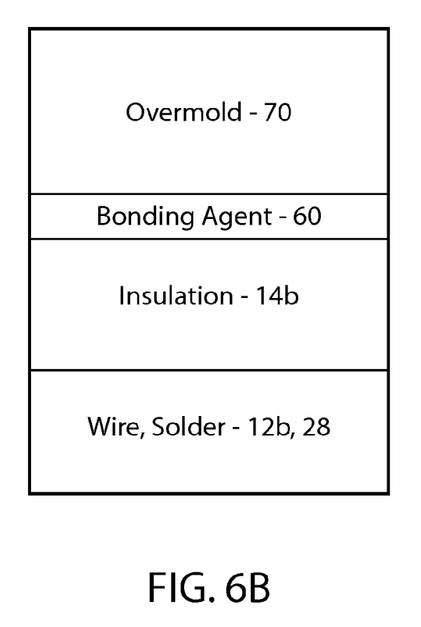

The overmold body 70 extends beyond the connector body 30 to encase a section of insulation 14b, as shown in FIG. 5B. FIG. 6A is a diagram showing the layers in cross-sectional view FIG. 5A. FIG. 6B is a further diagram showing the layers in cross-sectional view FIG. 5B. Notably, the juncture section 22b, epoxy 50 and juncture housing 30c are absent from FIGS. 5B and 6B.

FIGS. 5A and 6A show layers of material that are disposed in order from the center extending radially outward in the direction of arrow 80a as follows:

(a) a central bundle containing terminal ends 16b, solder 28 and juncture section 22b, (b) a layer of epoxy consisting of a thermoplastic material or a thermoset material, where the epoxy may take the form of a hot melt adhesive, (c) the juncture housing consisting of a plastic material, (d) a bonding agent in the form of a 1- or 2-part cement, and (e) an overmold body made from a thermoplastic material, a thermoset material or a thermoplastic elastomer.

FIGS. 5B and 6B show layers of material that are disposed in order from the center extending radially outward in the direction of arrow 80b as follows:

(i) a central bundle containing conductive wire 12b and solder 28, (ii) a layer of insulation 14b encasing the conductive wire, (iii) a bonding agent in the form of a 1- or 2-part cement, and (iv) an overmold body made from a thermoplastic material, a thermoset material or a thermoplastic elastomer.

The waterproof seal consists of the layers of material listed above. In other words, in a preferred embodiment, there are no other intermediate or external layers. The bonding agent and the overmold layer extend continuously from the juncture housing to the layer of insulation. The solder extends continuously from said terminal ends to said conductive wire to prevent moisture from wicking axially along said conductive wires. The device according to the invention is design to be used in combination with an electrical device coupled to the connector body. The solder prevents moisture from wicking axially along the conductive wires into the electrical device. As can be seen in FIGS. 5A, 5B, 6A and 6B, the wire and solder extend continuously from the juncture section back to the insulation of the wire. In addition the bonding agent and outer plastic jacket overmold extend continuously from the connector body back to the insulation of the wire. Thus the bonding agent/overmold layers are concentrically surrounding the wire/solder. The juncture section, epoxy and juncture housing which are present in FIGS. 5A and 6A, terminate at the back of the housing. Axially behind the juncture section/epoxy/juncture housing is the insulation. So at the center and exterior of the connector there are continuous layers of material: at the center the wire/solder; and at the exterior the bonding agent/overmold. While the middle part of the connector sees the juncture section/epoxy/juncture housing terminating with the insulation then being present along an axial line.

The various materials described above can be layered to establish a waterproof seal for an electrical connector. Also, other equivalent materials that are typically employed in the electrical connector industry may be used within the spirit of the invention.

All of the connectors shown in the figures are for illustrative purposes only. Any shape, size or form of connector may be used within the spirit of the invention

What is claimed is:

1. A waterproof seal for electrical assemblies comprising:
an electrical cable having at least one conductive wire covered with insulation and a terminal end stripped of insulation;
a metal post having a contact section and a juncture section securely connected to said terminal end;
solder (i) filling the spaces between the terminal end and the juncture section and (ii) covering the juncture section;
a connector body surrounding said metal post;
an epoxy material disposed between said connector body and said solder-covered juncture section to fill the space therebetween;
a bonding agent covering the connector body and cable insulation; and
an outer plastic jacket overmolded to said connector body, said bonding agent and said cable insulation, wherein said outer thermoplastic jacket prevents moisture from penetrating into said connector body, and wherein said solder and epoxy material occupy spaces within said connector body to prevent water from wicking along the wire.

2. The waterproof seal for electrical assemblies of claim 1, wherein said electrical cable includes two or more conductive wires covered with insulation.

3. The waterproof seal for electrical assemblies of claim 2, wherein the wire comprises a plurality of wire strands, and wherein said coating of solder fills the spaces between the wire strands.

4. The waterproof seal for electrical assemblies of claim 1, wherein the wire comprises solid wire.

5. The waterproof seal for electrical assemblies of claim 1, wherein said solder coating comprising a tin solder coating to electrically and mechanically improve the connection between the wire and the juncture section.

6. The waterproof seal for electrical assemblies of claim 1, wherein said solder extends continuously over said juncture section and terminal end back to said insulation.

7. The waterproof seal for electrical assemblies of claim 1, wherein the epoxy is selected from the group consisting of a thermoplastic material, a thermoset material, and a hot melt adhesive.

8. The waterproof seal for electrical assemblies of claim 7, wherein the epoxy is a hot melt adhesive (HMA).

9. The waterproof seal for electrical assemblies of claim 1, wherein the bonding agent comprises one-part or two-part epoxy cement.

10. The waterproof seal for electrical assemblies of claim 9, wherein the epoxy material is a water-borne epoxy coating.

11. The waterproof seal for electrical assemblies of claim 1, wherein the outer plastic jacket is made from a thermoplastic material.

12. The waterproof seal for electrical assemblies of claim 11, wherein the outer thermoplastic jacket is made from a material selected from the group consisting of polyethylene (PE), polystyrene (PS), polypropylene (PP), polyvinyl chloride (PVC), ethylene propylene diene monomer (EPDM) and Chlorobutyl Rubber.

13. The waterproof seal for electrical assemblies of claim 11, wherein the outer thermoplastic jacket is made from a thermoplastic elastomer (TPE).

14. The waterproof seal for electrical assemblies of claim 1, wherein the electrical assembly provides a wicking barrier to prevent fluid from damaging attached equipment.

15. The waterproof seal for electrical assemblies of claim 1, wherein the electrical assembly is configured to be used in an outdoor lighting assembly.

16. The waterproof seal for electrical assemblies of claim 1, wherein said terminal ends are sealed within multiple concentric layers of protective materials comprising in order from the center extending radially outward:
    (a) a central bundle containing terminal ends, solder and juncture section,
    (b) a layer of epoxy consisting of a thermoplastic material or a thermoset material,
    (c) the juncture housing consisting of a plastic material,
    (d) a bonding agent in the form of a 1- or 2-part cement, and
    (e) an outer plastic jacket overmold made from a thermoplastic material, a thermoset material or a thermoplastic elastomer,
wherein the multiple layers of protective materials encase the terminal ends and prevent moisture from penetrating radially inward.

17. The waterproof seal for electrical assemblies of claim 16, wherein said conductive wires are sealed within multiple concentric layers of protective materials comprising in order from the center extending radially outward:
    (i) a central bundle containing conductive wire and solder,
    (ii) a layer of insulation encasing the conductive wire,
    (iii) a bonding agent in the form of a 1- or 2-part cement, and
    (iv) an outer plastic jacket overmold made from a thermoplastic material, a thermoset material or a thermoplastic elastomer,
wherein the multiple layers of protective materials encase the conductive wires and prevent moisture from penetrating radially inward.

18. The waterproof seal for electrical assemblies of claim 17, wherein said bonding agent and said outer plastic jacket overmold extend continuously from said juncture housing to said layer of insulation, and wherein said solder extends continuously from said terminal ends to said conductive wire to prevent moisture from wicking axially along said conductive wires.

19. The waterproof seal for electrical assemblies of claim 18, further comprising an electrical device coupled to said connector body, wherein said solder prevents moisture from wicking axially along said conductive wires into said electrical device.

* * * * *